Sept. 10, 1968     W. E. ANDERSON ET AL     3,400,479
ANIMAL TAG FOR ATTACHMENT TO DEWLAP AND METHOD OF ATTACHING SAME
Filed Oct. 21, 1965     2 Sheets-Sheet 1
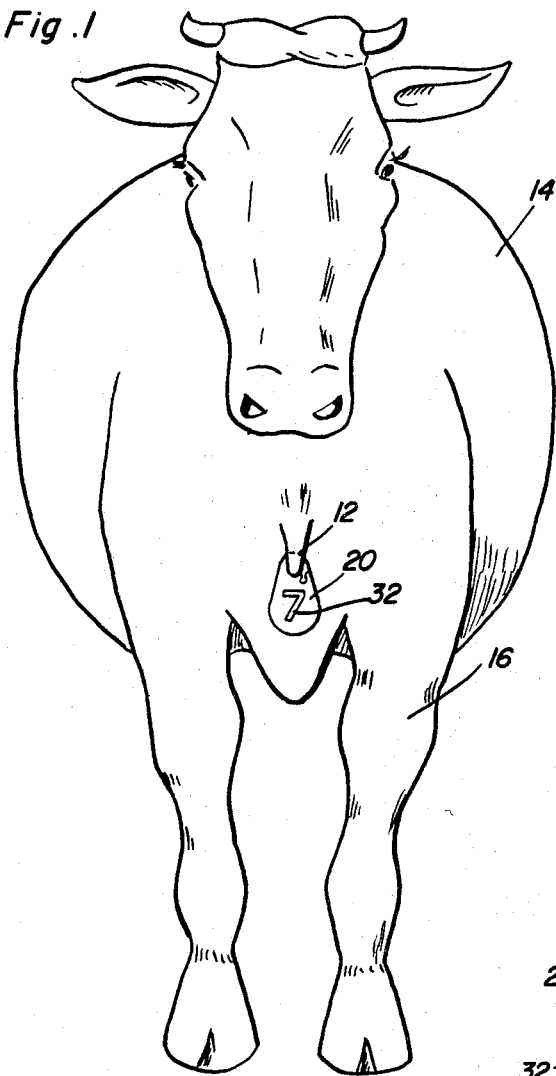
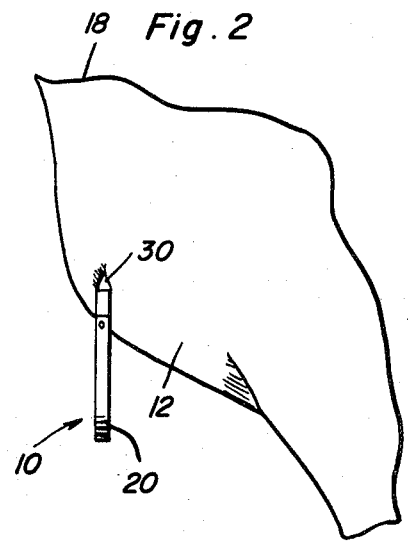
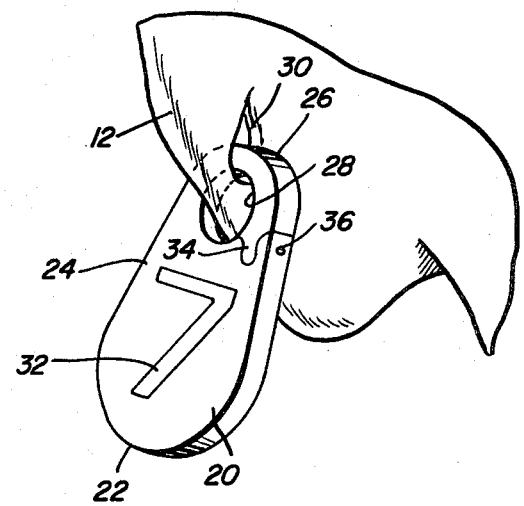
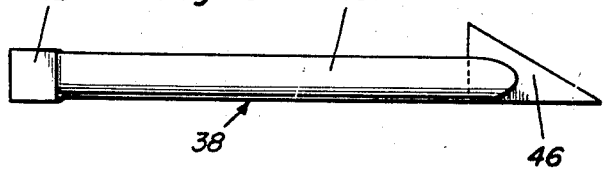
Wayne E. Anderson
Donald R. Anderson
INVENTORS

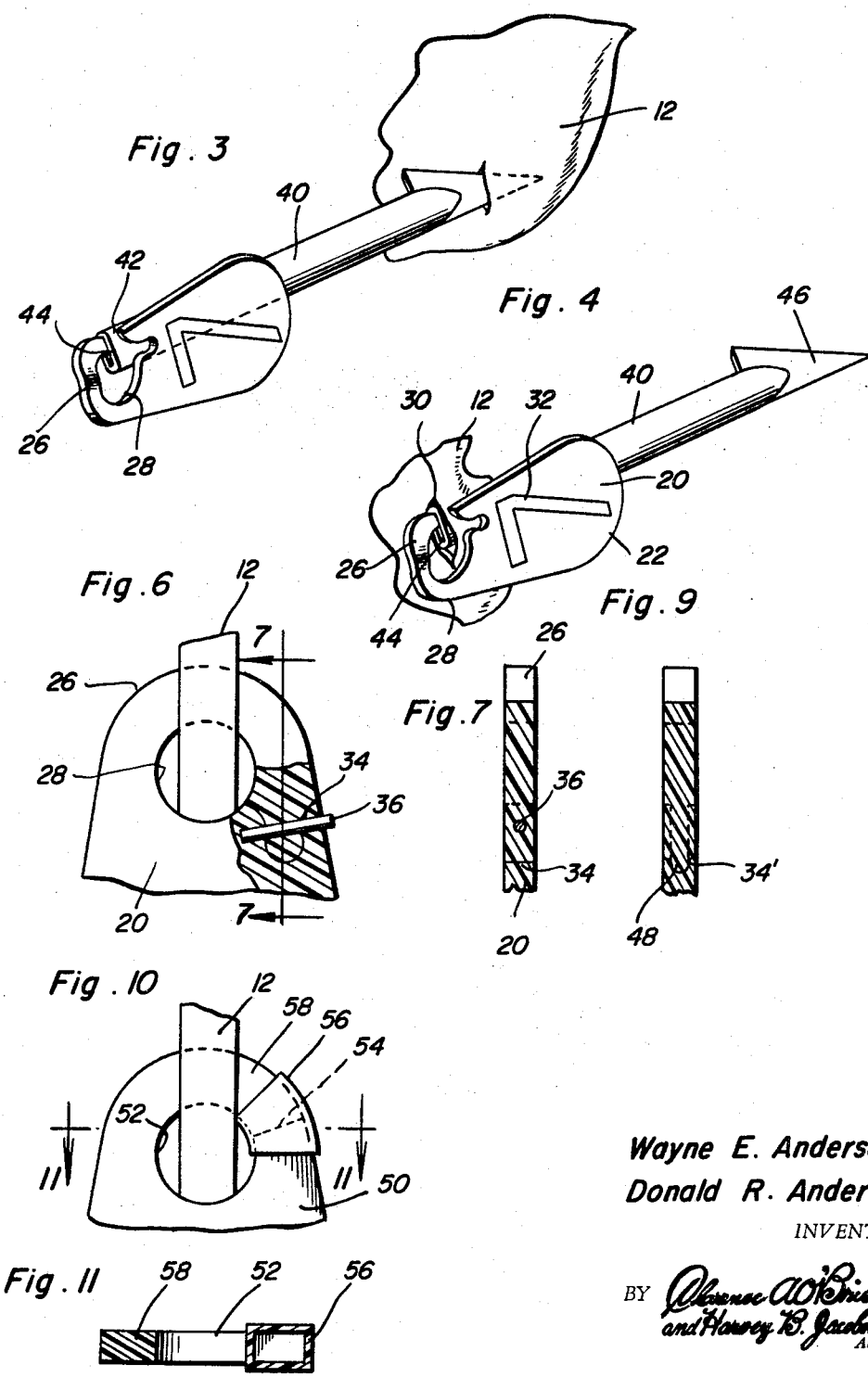

United States Patent Office 3,400,479
Patented Sept. 10, 1968

3,400,479
ANIMAL TAG FOR ATTACHMENT TO DEWLAP AND METHOD OF ATTACHING SAME
Wayne E. Anderson, Rte. 1, Box 7A, and Donald R. Anderson, Rte. 1, Box 45, both of Gothenburg, Nebr. 69138
Filed Oct. 21, 1965, Ser. No. 499,701
5 Claims. (Cl. 40—300)

ABSTRACT OF THE DISCLOSURE

A method of tagging animals utilizing a tubular piercing instrument which frictionally retains a deformed end portion of a plastic tag. One end of the instrument forms an aperture through a dewlap when pushed therethrough and the other end of the instrument guides the retained deformed end portion of the tag through the aperture. Upon passage of the deformed end portion through the aperture, it is removed from the instrument and returned to a coplanar alignment with the remaining portion of the tag. Securing means retain the end portion of the tag in its coplanar position.

---

The present invention generally relates to a tag used for identification purposes on animals and more particularly a tag of a particular characteristic adapted to be supported from the dewlap of animals especially of the bovine family.

It is the present-day practice to tag animals for identification purposes. Such tags are quite varied in construction and mode of attachment. One of the problems existing in this field is the difficulty in reading the identification tag without confining the animal inasmuch as the indicia on the tag are sometimes quite small. Another problem relates to the manner of installation and danger of the tag becoming entangled with bushes, wire fences and the like. Accordingly, it is an object of the present invention to provide an animal tag adapted to be attached to the dewlap of an animal which is simple in construction, easy to install and reduces the possibility of the tag becoming entangled with bushes or fences and at the same time is directly and positively attached to the dewlap by virtue of the particular construction of the tag itself and a novel method of attaching the tag to the dewlap which also constitutes a signifiiant part of the present invention.

Another important object of the present invention is to provide an animal tag and a tool and procedure for installing the tag directly on the dewlap with no extraneous supports thus retaining the tag immediately adjacent the surface of the hide or skin of the animal thereby reducing the tendency of the tag becoming entangled and also enabling the incision made in the dewlap when installing the tag thereto to readily heal inasmuch as there is no clamping or gripping pressure exerted on the dewlap after the tag has been installed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front view of an animal having the identification tag of the present invention attached to the dewlap;

FIGURE 2 is a fragmental side elevational view of the animal tag and the manner of attaching it as illustrated in FIGURE 1;

FIGURE 3 is a fragmental perspective view illustrating the association of the tag and implement for installing the tag together with the initial position of the implement in relation to the dewlap;

FIGURE 4 is a fragmental perspective view similar to FIGURE 3 but illustrating the next step in installing the tag on the dewlap;

FIGURE 5 is a fragmental perspective view illustrating the final step in installation of the tag;

FIGURE 6 is a fragmental view of the tag with portions broken away illustrating the manner in which the tag is secured in place on the dewlap;

FIGURE 7 is a detailed sectional view taken substantially upon a plane passing along section line 7—7 of FIGURE 6;

FIGURE 8 is a perspective view of the implement employed in installing the tag;

FIGURE 9 is a sectional view similar to FIGURE 7 but illustrating a modified tag structure;

FIGURE 10 is a fragmental view similar to FIGURE 6 but illustrating another form of tag structure; and FIGURE 11 is a detailed sectional view taken substantially upon a plane passing along section line 11—11 illustrating further structural details of the structure of FIGURE 10.

Referring now specifically to the drawings, the numeral 10 generally designates the animal tag of the present invention which is attached directly to the dewlap 12 of a cow 14. The dewlap 12 is the loose depending fold of skin immediately forward of the front legs 16 and at the lower end of the neck region 18. The tag includes a body 20 having parallel planar surfaces and a rounded bottom edge 22 and slightly converging side edges 24 and a rounded narrow edge or top 26 which has an opening 28 formed therein for receiving a portion of the dewlap 12 which is formed by an incision 30 in the dewlap 12. Both surfaces of the tag 10 include indicia 32 thereon so that as the animal is viewed from the front, the indicia 32 will be readily observable. Preferably, the tag is of laminated construction with the indicia 32 being completely encapsulated with a plastic material or the like with the indicia being readily observable by virtue of it being of a contrasting color as compared with the background surface of the tag.

The opening 28 is provided with an entrance formed by a separation line 34 which extends from the opening 28 to the exterior edge of the tag so that the edges of the line of severance 34 may be separated by deflecting a portion of the tag laterally so that one portion of the tag forming the line of separation 34 will be spaced laterally of the other section thereof thus forming an entrance way into the opening 28. An insertable pin 36 extends through the line of separation which is irregular as illustrated in FIGURE 5 to lock the portions of the tag which form the line of separation thus locking the tag body 20 to the dewlap in the manner illustrated in FIGURES 5, 6 and 7.

For installing the tag, a tool or implement 38 is provided which is in the form of a tubular member 40 having a flattened end portion 42 forming a socket 44 for receiving the deflected portion of the tag which forms the line of separation as illustrated in FIGURE 3 whereby the tube 40 will form a guide for insertion of the free end portion of the part of the tag which forms the line of separation 34 as it enters the incision 30 as illustrated in FIGURE 4. The other end of the tube 40 is provided with a transversely extending sharpened blade 46 having a dimension slightly greater than the tubular member 40 for forming the insertion 30 and enabling the tubular member 40 to be inserted on through the opening 30 as it is formed thus bringing the free end portion of the line of separation 34 through the opening 30 so that it can then be realigned with the main part of the tag and the pin 36 inserted therein thus locking the tag in place. The end portion of the tag which fits in the socket 44 is only frictionally retained therein and the structure of the tag being of laminated plastic is sufficiently flexible and resilient to enable the portions of the tag forming the line of separation 34 may be laterally deflected as illustrated in FIGURES 3 and 4.

FIGURE 9 illustrate a slightly modified form of the invention in which the line of separation 34' is laterally irregular in that a projection is provided as designated by numeral 48 so that the line of separation 34' is frictionally retained in aligned condition as illustrated in FIGURE 9. This avoids the necessity of inserting a pin 36 thus facilitating the case of installation of the tag.

FIGURES 10 and 11 illustrate another modification of tag designated by the numeral 50 in which the opening is designated by numeral 52 for receiving the dewlap 12 and a line of separation 54 is provided with a sliding sleeve 56 normally bridging the line of separation but being capable of being moved arcuately to expose the line of separation 54 thus enabling the thin portion of the tag designated by numeral 58 to be deflected for insertion into the socket 44 during installation and subsequently realigned with the main body of the tag and the sleeve 56 moved back into the position illustrated in FIGURE 10 thus retaining the component of the tag in alignment. This structure also eliminates the necessity of inserting a pin and provides a positive lock for retaining the tag in place on the dewlap as illustrated.

As will be evident, the tag 10 will identify a specific animal and the indicia thereon may be read from a distance thus rendering it unnecessary to confine the animal such as is necessary to read a small tattoo or small tag. The relatively large tag with the relatively large and readily observable indicia is mounted on the dewlap which is quite tough as compared with the ear that is now commonly used for installing tags. Thus, this tag is more securely attached and may be used on cattle, calves or other domestic and wild game animals. It has been the practice to employ a neck chain or rope to hold a tag in place. However, as the animal grew to maturity, it was necessary to install bigger chains whereas in this invention, there is no need to ever adjust the tag even though the animal materially changes in weight. Additionally, a neck chain or rope frequently becomes too loose and allows the rope or chain to hook onto a protruding object. As compared with this, the present invention provides nothing whatsoever to become entangled or hooked onto a protruding object inasmuch as the hole in the tag is substantially filled with the flesh of the animal.

The dewlap applicator or instrument 38 is preferably constructed of a piece of stainless steel tubing having the trailing end thereof formed into an oblong configuration for receiving the neck of the tag and the other end receiving a knife blade fixedly secured thereto and the instrument is pushed into the hide and pulled on through thus installing the tag in the process. The mating edges of the part of the tag is deflected, may be retained in place by several methods including the pin or wire brad, the sleeve, friction or glue as deemed appropriate for various utilities.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An animal identification attachment comprising a tag characterized by a main body having indicia thereon and including an end portion having an opening therein, an entrance forming slit interconnecting said opening and the peripheral edge of the end portion of the main body to enable deflection of the end portion for insertion through in incision in the dewlap of an animal, fastening means for releasably retaining the edges of the entrance slit in aligned position thereby retaining the tag on the dewlap.

2. An animal tag as defined in claim 1 in combination with an application instrument including an elongated tubular member having a socket at one end for receiving and frictionally retaining the deflected edge portion of the entrance slit, the other end of said tubular member having a transversely extending axially projecting knife blade for forming an incision in the dewlap and guiding the tubular member therethrough whereby the deflected edge portion of the entrance slit will be guided through the dewlap at the same time as the incision is made by inserting the blade therethrough.

3. A tool for installing a substantially planar animal tag on the dewlap of an animal comprising, an elongated tubular member having an axially projecting transversely extending blade at one end thereof and forming an incision through the dewlap and guiding the tubular member into the incision, the other end of the tubular member having a socket thereon receiving and frictionally retaining a deflected planar end portion of an entrance slit to an opening in a tag, said deflected end portion remaining planar therein whereby the deflected end portion may be guided through the incision in the dewlap for mounting the tag on the dewlap.

4. The method of installing a substantially planar identifying tag on the dewlap of an animal, consisting of the steps of, forming an incision through the dewlap, inserting a tubular guide member having a socket at its trailing end through the incision and inserting a deflected planar edge portion of an opening in a tag through the incision by inserting the deflected edge portion of the tag into the socket, said deflected end portion remaining planar therein and frictionally retaining said deflected end portion as it is pushed through the incision.

5. The method set forth in claim 4 together with the steps of returning said deflected edge portion to a coplanar alignment with the remaining portion of the tag and securing said edge portion to said coplanar position.

References Cited

UNITED STATES PATENTS

| 3,334,434 | 8/1967 | Melin | 40—301 |
|---|---|---|---|
| 427,075 | 5/1890 | Haaff | 40—300 |
| 460,138 | 9/1891 | Hornberger | 128—330 |
| 1,430,641 | 10/1922 | Ginn | 40—20 |
| 2,924,198 | 2/1960 | McMurray. | |

FOREIGN PATENTS 670,477  9/1963  Canada.

EUGENE R. CAPOZIO, Primary Examiner.

WILLIAM H. GRIEB, Assistant Examiner.